US012752970B2

(12) United States Patent
Xiao

(10) Patent No.: US 12,752,970 B2
(45) Date of Patent: Oct. 6, 2026

(54) TELESCOPIC ROD STRUCTURE AND ADJUSTABLE BOX

(71) Applicant: TAIZHOU SUKK TECHNOLOGY CO., LTD, Taizhou (CN)

(72) Inventor: Shuangshuang Xiao, Taizhou (CN)

(73) Assignee: TAIZHOU SUKK TECHNOLOGY CO., LTD, Taizhou (CN)

( * ) Notice: Subject to any disclaimer, the term of this patent is extended or adjusted under 35 U.S.C. 154(b) by 497 days.

(21) Appl. No.: 18/481,339

(22) Filed: Oct. 5, 2023

(65) Prior Publication Data

US 2024/0418191 A1 Dec. 19, 2024

(30) Foreign Application Priority Data

Jun. 14, 2023 (CN) ......................... 202321517644.9
Jun. 30, 2023 (CN) ......................... 202321691607.X

(51) Int. Cl.

*B65D 43/16* (2006.01)
*E05F 1/12* (2006.01)
*E05F 3/02* (2006.01)
*E05F 3/20* (2006.01)
*E05F 3/22* (2006.01)

(52) U.S. Cl.

CPC .......... *B65D 43/164* (2013.01); *E05F 1/1261* (2013.01); *E05F 3/02* (2013.01); *E05F 3/20* (2013.01); *E05F 3/224* (2013.01); *E05Y 2800/122* (2013.01); *E05Y 2999/00* (2024.05)

(58) Field of Classification Search

CPC . B65D 43/164; B65D 11/1873; E05F 1/1261; E05F 3/02; E05F 3/20; E05F 3/224; E05F 15/70; E05Y 2999/00; E05Y 2800/122; F16B 7/10; A47G 29/141; A47G 29/20; A47G 29/22; B65F 1/1638; E05D 3/127; E05D 3/147; B62D 25/088; B60J 5/047; B60J 5/0472; B60J 5/10

See application file for complete search history.

(56) References Cited

U.S. PATENT DOCUMENTS 3,059,269 A * 10/1962 Selinger .................... E05F 3/02 267/155
3,371,816 A * 3/1968 Ricci .................. B65D 11/1873 220/4.28
3,792,556 A * 2/1974 Anghinetti ................ E05F 3/22 49/7
4,185,415 A * 1/1980 LaConte ................... E05D 3/06 49/248
4,359,119 A * 11/1982 Kammerman ........ E05F 1/1091 49/386
4,429,491 A * 2/1984 Bruns ..................... E05F 15/53 49/340

(Continued)

*Primary Examiner* — William L Miller

(57) ABSTRACT

A telescopic rod structure is provided. The telescopic rod structure includes a telescopic rod, a fixing piece and a movable piece, and the telescopic rod includes a sleeve and a piston rod sliding on the sleeve, driving the piston rod to slide in the sleeve so that the telescopic rod can be extended or shortened. The fixing piece and the movable piece are respectively hinged at the two ends of the telescopic rod, and the movable piece is hinged with the fixing piece, the three form a triangular structure, and the triangular structure can be switched between an unfolded first state and a folded second state. An adjustable box using the telescopic rod structure is also provided.

13 Claims, 26 Drawing Sheets

(56) References Cited

U.S. PATENT DOCUMENTS 4,712,538 A * 12/1987 Hardie .................. A61H 33/06 601/16
4,735,018 A * 4/1988 Duncan .................. E05F 15/53 49/340
4,782,972 A * 11/1988 Wenkman ................. B42F 7/10 312/263
4,899,420 A * 2/1990 Bye ........................ E05F 3/02 16/349
4,935,989 A * 6/1990 Miller ...................... E05F 3/02 16/66
4,991,675 A * 2/1991 Tosconi ................. B62D 25/10 49/386
5,018,687 A * 5/1991 Kupfernagel ......... B64C 1/1415 244/129.5
5,435,406 A * 7/1995 Gaffoglio ................ E05D 3/145 296/146.12
5,464,115 A * 11/1995 Tisbo ..................... A45C 13/34 206/508
5,471,708 A * 12/1995 Lynch ..................... F16F 9/516 16/72
5,495,639 A * 3/1996 Wartian ................ E05F 1/1016 16/80
5,593,203 A * 1/1997 Abbott ................. B64D 11/003 224/311
5,954,264 A * 9/1999 Keller ................ A47G 29/1212 49/340
6,000,071 A * 12/1999 Fettes ..................... E04H 4/084 49/386
6,041,548 A * 3/2000 Miller ................... E05F 1/1091 49/340
6,041,845 A * 3/2000 Couch ................... E05F 15/668 160/209
6,793,110 B2 * 9/2004 Hamilton ................... B62J 9/23 224/435
7,073,213 B2 * 7/2006 Duarte .................... E04H 4/084 220/264
8,051,534 B1 * 11/2011 Luca ......................... E05F 3/02 16/84
9,638,496 B2 * 5/2017 Peters .................... B65D 43/26
10,087,669 B1 * 10/2018 Gnadinger ............ E05F 1/1091
10,147,067 B2 * 12/2018 Pleis .................. A47G 29/1225
11,542,739 B1 * 1/2023 Liao .......................... E05F 3/02
11,608,208 B2 * 3/2023 Leng .................. B65D 11/1873
D1,001,503 S * 10/2023 Xiao .............................. D3/302
2004/0090083 A1 * 5/2004 Greuel .................. E05F 15/611 296/146.4
2005/0156446 A1 * 7/2005 Guillez ................... E05F 15/70 296/76
2009/0072551 A1 * 3/2009 Hirtsiefer ................ E05D 15/46 292/196
2010/0127606 A1 * 5/2010 Collene ................. E05F 1/1292 16/68
2014/0230330 A1 * 8/2014 Piermee .................. F16F 1/128 49/386
2020/0029664 A1 * 1/2020 Tonelli ...................... E05F 3/02
2020/0072532 A1 * 3/2020 Möller .................. F25D 23/028
2020/0131830 A1 * 4/2020 Byun .................. E05D 11/0054
2020/0263473 A1 * 8/2020 Leng ........................ A45C 5/03
2020/0385167 A1 * 12/2020 Ahmed ................ B65D 85/187
2021/0172230 A1 * 6/2021 D'Allesandro ....... E05F 1/1253
2021/0238902 A1 * 8/2021 Byun .................... E05D 5/0276
2021/0298507 A1 * 9/2021 Grijalva ................. A47G 29/20
2023/0383584 A1 * 11/2023 Schneider ................. E05D 3/16
2025/0154809 A1 * 5/2025 Ding .......................... E05D 3/10
2025/0179867 A1 * 6/2025 Meizinger ................. E06B 5/01

* cited by examiner

TELESCOPIC ROD STRUCTURE AND ADJUSTABLE BOX

FIELD OF THE INVENTION

The present utility relates to the technical field of telescopic rods, and more particularly to a telescopic rod structure and an adjustable box using the telescopic rod structure.

BACKGROUND OF THE INVENTION

Telescopic rods refer to structures which are formed by assembling a sleeve and a piston rod, and realize the length change of the rod body through the sliding of the piston rod. The telescopic rod generally includes electric telescopic rods, hydraulic telescopic rods, pneumatic telescopic rods and other telescopic rods with different driving sources. The telescopic rods are generally applied to a box cover, an automobile machine cover and the like need to open the part of the cover body in a turn over mode, and the telescopic rod is used for assisting the opening of the cover body, the closing action and the supporting action after the cover body is opened.

Current telescopic rods applied to the box cover are usually fixedly mounted on movable cover bodies by an end of the sleeve, and an end of the piston rod is fixed on an immovable body, such as a box frame body or an automobile body. On one hand, the single-point fixing at the two ends of the telescopic rod enables the stress points of the telescopic rod to be too concentrated, resulting that the telescopic rod and the stressed cover body and other articles are easily damaged, the service life of the telescopic rod and the application article is shortened, on the other hand, the telescopic rod is directly arranged on the cover body and the fixing piece, the number of fixed points is less, the overall structure is not stable enough.

SUMMARY OF THE INVENTION

(1) Solved Technical Problem

In order to solve the problems, the invention provides a telescopic rod structure, which is more stable and longer service life.

(2) Technical Solution

To achieve the above purpose, the present invention provides the following technical solution:

In a first aspect, a telescopic rod structure is provided. The telescopic rod structure includes a telescopic rod, a fixing piece and a movable piece, and the telescopic rod includes a sleeve and a piston rod slidably connected to the sleeve, driving the piston rod to slide in the sleeve so that the telescopic rod can be extended or shortened. The fixing piece has a first end and an opposite second end. The fixing piece is fixedly arranged on an immovable body, and the first end of the fixing piece is hinged with an end of the piston rod. The movable piece is fixedly arranged on a movable body, an end of the movable piece is hinged with the second end of the fixing piece. The movable piece is hinged with an end of the sleeve by a connecting portion. The telescopic rod, the movable piece and the fixing piece enclose a transformable triangular structure, and the triangular structure has a first state unfolded in a triangular shape and a second state folded in a strip shape, when the telescopic rod is driven to extend, the triangular structure is switched to a first state, when the telescopic rod is driven to shorten, the triangular structure is switched to a second state.

In a second aspect, an adjustable box is provided. The adjustable box includes the above telescopic rod structure, a bottom plate, and a plurality of side plates. The bottom plate is detachably connected with the side plates, the plurality of side plates and the bottom plate cooperatively form an accommodating space, the side plates are detachably connected with a frame body, and the frame body are rotatably connected with a cover body for covering the accommodating space, the telescopic rod structure is arranged between the cover body and the frame body. When the cover body is opened, the triangular structure is in a first state, the telescopic rod structure can support the cover body, and when the cover body is closed, the triangular structure is in a second state

(3) Beneficial Effects

Compared with the prior art, the present invention brings the following beneficial effects:

As the fixing piece and the movable piece are respectively hinged at the two ends of the telescopic rod, and the movable piece is hinged with the fixing piece, the three forms a triangular structure, and the triangular structure can be transformed between an unfolded first state and a folded second state due to the telescopic rod can be extended and shortened, so that a movable body, such as a cover body can be stably supported when the triangular structure is in the first state, and the triangular structure can be folded under the movable body when the triangular structure is in the second state, that is, the triangular structure can be better accommodated in the space between the immovable body and the movable body. At the same time, the fixing piece and the movable piece are both in surface contact and fit on the immovable body and the movable body, so that the problem of tensile deformation of the corresponding object when the objects at two ends of the traditional telescopic rod are in point contact is solved, and the service life of the telescopic rod structure and the article applying the telescopic rod structure is prolonged.

BRIEF DESCRIPTION OF THE DRAWINGS

The accompanying drawings are used to provide a further understanding of the present invention, and constitute a part of the description, and are used to explain the present invention together with the embodiments of the present invention, and do not constitute a limitation to the present invention. In the attached drawings.

Figure 1:
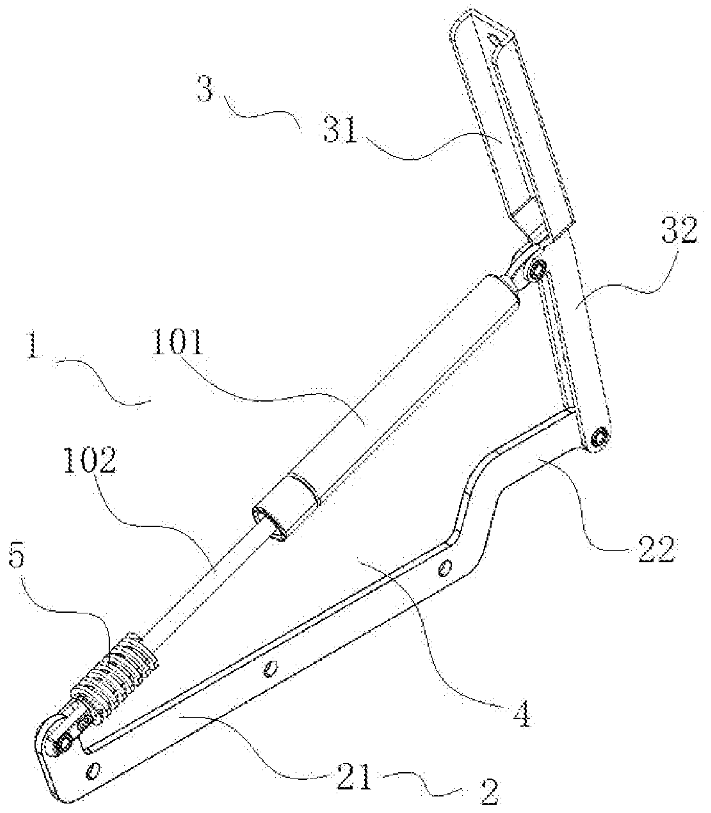
FIG. 1 is a schematic structural view of a telescopic rod structure which is in a first state according to an embodiment one of the present invention.

Labels in the drawings: 1, telescopic rod; 101, sleeve; 102, piston rod; 2, fixing piece; 21, connecting section; 22, transition section; 3, movable piece; 30, connecting portion; 31, first receiving section; 310, receiving groove; 32, second receiving section; 4, triangular structure; 5, elastic member; 6, telescopic rod structure; 7, bottom plate; 8, side plate; 81, first plug plate; 82, first slot; 9, frame body; 91, first frame portion; 92, second frame portion; 93, buckle head; 94, buckle seat; 10, box cover; 11, lower slot; 12, upper slot; 13, first adapter; 14, second adapter; 15, first fixing member; 16, second fixing member; 17, through hole.

DETAILED DESCRIPTION OF PREFERRED EMBODIMENTS

The following description will refer to the accompanying drawings to more fully describe the contents of the present application. It is apparent that here only constitutes a part of the embodiments of the present invention, not all of the embodiments. Based on the embodiments of the present invention, all other embodiments obtained by persons of ordinary skill in the art without making creative efforts belong to the protection scope of the present invention.

Embodiment One

Referring to FIGS. 1-7, the embodiment of the present invention discloses a telescopic rod structure, which is applied to an immovable body and at a same time applied to a movable body. A side edge of the movable body is rotatably connected to the immovable body, and in present embodiment, the movable body is a cover body. The telescopic rod structure includes a telescopic rod 1, a fixing piece 2 and a movable piece 3. The telescopic rod 1 includes a sleeve 101 and a piston rod 102 slidably connected to the sleeve 101, the piston rod 102 is driven to slide in the sleeve 101 so that the telescopic rod 1 can be extended or shortened. The fixing piece 2 has a first end and an opposite second end, the fixing piece 2 is fixedly mounted in a fitting manner on an immovable body, and the first end of the fixing piece 2 is hinged with the end of the piston rod 102. The movable piece 3 is fixedly arranged on the cover body in a fitting manner, and the end of the movable piece 3 is hinged with the second end of the fixing piece 2. The movable piece 3 is also provided with a connecting portion 30 configured for being hinged with the end of the sleeve 101. In particular, the fixing piece 2 and the movable piece 3 each are in a strip shape, and each of the fixing piece 2 and the movable piece 3 is in surface contact with corresponding objects, i.e. when the two ends of the telescopic rod 1 are released from the stressed object, the point contact is converted into a strip-shaped surface contact, so that the two ends of the telescopic rod 1 cannot directly press the cover body and the immovable body, the cover body and the immovable body are prevented from being extruded and deformed by pulling force, thereby achieving the purpose of prolonging the service life.

Furthermore, the telescopic rod 1, the movable member 3 and the fixing piece 2 enclose a transformable triangular structure 4, and the triangular structure 4 has a first state in which it is unfolded into a triangular shape, and a second state in which it is folded into a strip shape, when the telescopic rod 1 is driven to extend, the triangular structure 4 is switched to the first state, when the telescopic rod 1 is driven to shorten, the triangular structure 4 is switched to the second state. In particular, the first state is generally for supporting the cover body, the telescopic rod structure is capable of being applied to a corresponding object by forming a stable triangular structure 4, so that the cover body can be stably supported. The second state is generally at when the cover body is in the closed state. The telescopic rod structure is also capable of transforming the triangular structure 4 into a folded second state, thereby achieving the purpose of saving space.

According to the technical scheme, the telescopic rod structure can be applied to various cover bodies, such as a box cover, an automobile engine and a front cover, a cabinet, a cabinet door and the like. By articulating, that is hinging the fixing piece 2 and the movable piece 3 at both ends of the telescopic rod 1, and articulating the movable piece 3 with the fixing piece 2, the three form the triangular structure 4. By virtue of the fact that the telescopic rod 1 can be extended and shortened, such that the triangular structure 4 can be switched between a first state and a second state, such that the cover can be stably supported when the triangular structure 4 is in the first state; and the triangular structure 4 can be better accommodated by the cover body in the second state. At the same time, the fixing piece 2 and the movable piece 3 are arranged on the immovable body and the cover body in a surface contact manner, thereby solving the traditional problem of tensile deformation of objects that in point contact with two ends of the telescopic rod 1, and the service life of the telescopic rod structure and the article applying the telescopic rod structure is prolonged.

It should also be noted that in this embodiment, the telescopic rod 1 is a hydraulic or pneumatic rod, which allows the telescopic rod 1 to automatically extend or shorten when extended or shortened to a certain distance under internal hydraulic or pneumatic drive, making it easy for the user to control the corresponding cover.

Due to the fact that the telescopic rod structure can be applied to different types of cover bodies, the weight of the cover body varies. When dealing with lighter cover bodies, the user can easily lift the cover body, the telescopic rod 1 itself can help lift the cover body. When dealing with heavier cover bodies, the user will have difficulty flipping the cover body. Therefore, the telescopic rod structure provided in this embodiment also includes elastic member 5, which is set on the piston rod 102. When the triangular structure 4 is in the second state, the elastic member 5 is in a compressed state under the force of the sleeve 101. Specifically, the elastic member 5 is a compressed elastic member 5. When the triangular structure 4 is in the first state, the elastic member 5 is not under force. When the telescopic rod 1 gradually shortens, the end of the sleeve will contact and compress the elastic member 5. When the telescopic rod 1 shortens to the minimum length, the elastic member 5 is in a compressed state, and the triangular structure 4 is in the second state, in which the cover body is closed and an immovable body is closed. When the user wants to lift the cover body to open, while flipping the cover body, the telescopic rod 1 extends, and the elastic potential energy of the elastic member 5 is released, thereby assisting the telescopic rod 1 in extending to assist the cover body change to be open, reducing the force required for the user to open the cover body and making it easier for the user to lift the heavier cover body.

Figure 2:
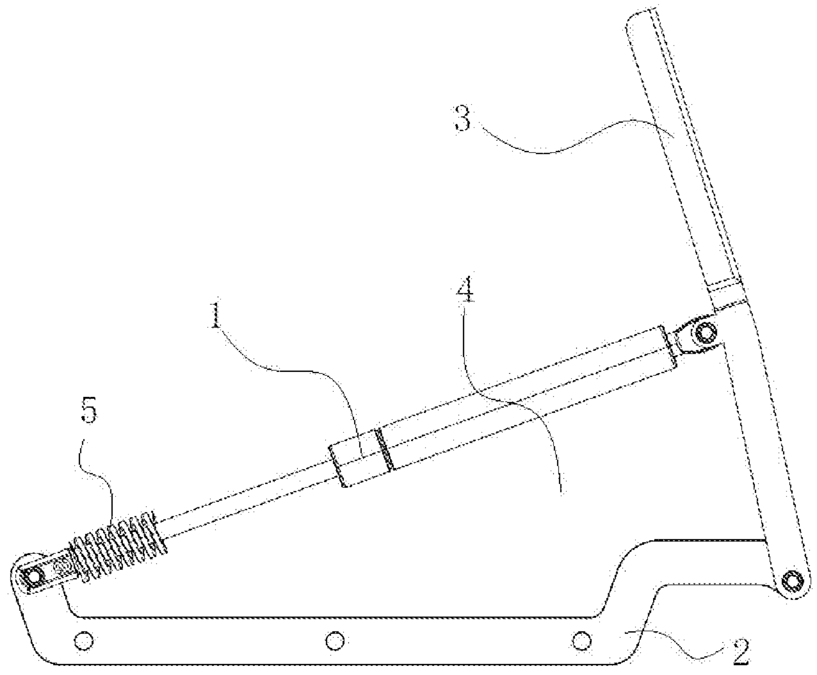
FIG. 2 is a schematic planar view of the telescopic rod structure which is in a first state according to an embodiment one of the present invention.
Figure 3:
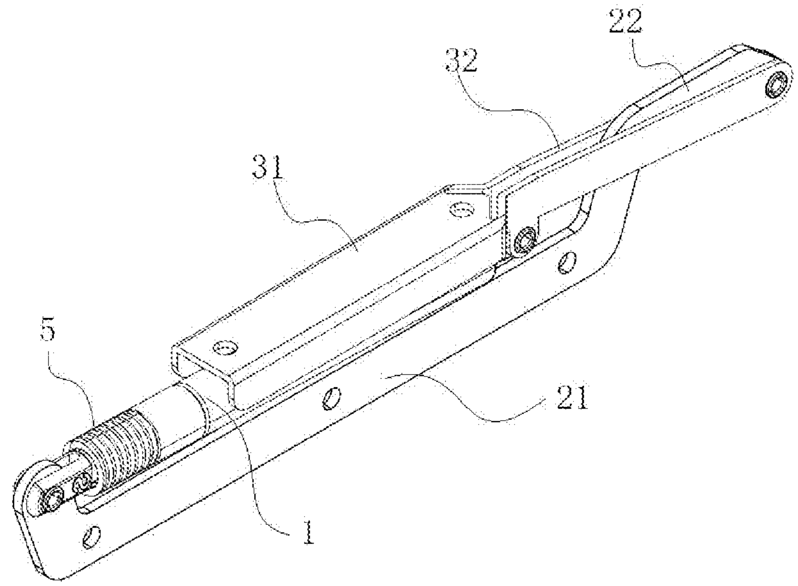
FIG. 3 is a schematic structural view of the telescopic rod structure which is in a second state according to an embodiment one of the present invention.
Figure 4:
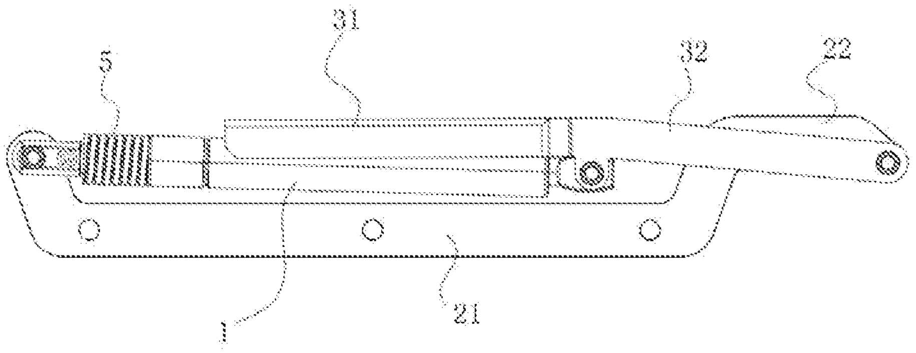
FIG. 4 is a schematic planar view of the telescopic rod structure which is in a second state according to an embodiment one of the present invention.
Figure 5:
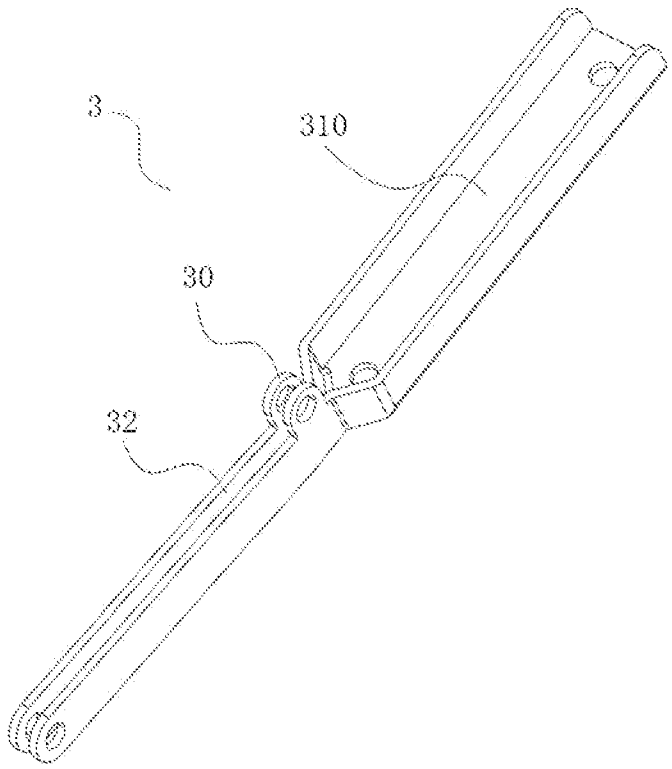
FIG. 5 is a schematic structural view of a movable piece according to the embodiment one of the present invention.
Figure 6:
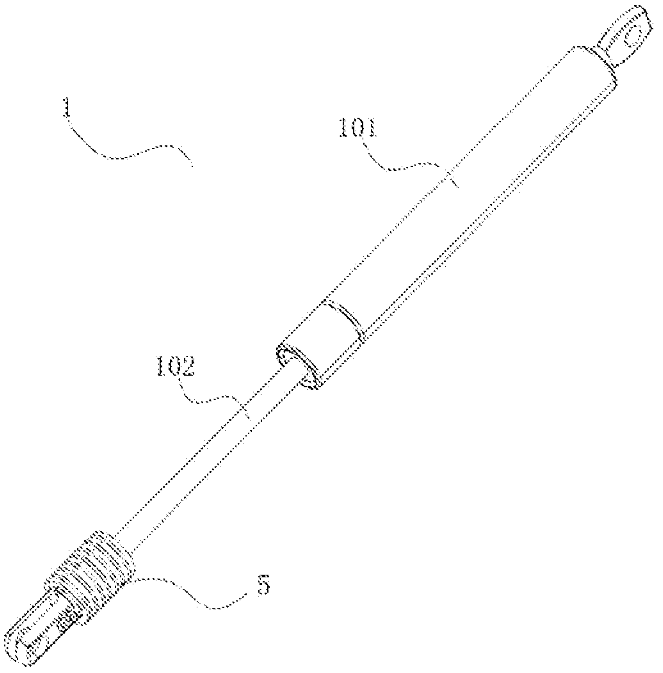
FIG. 6 is a schematic structural view of a telescopic rod according to the embodiment one of the present invention.
Figure 7:
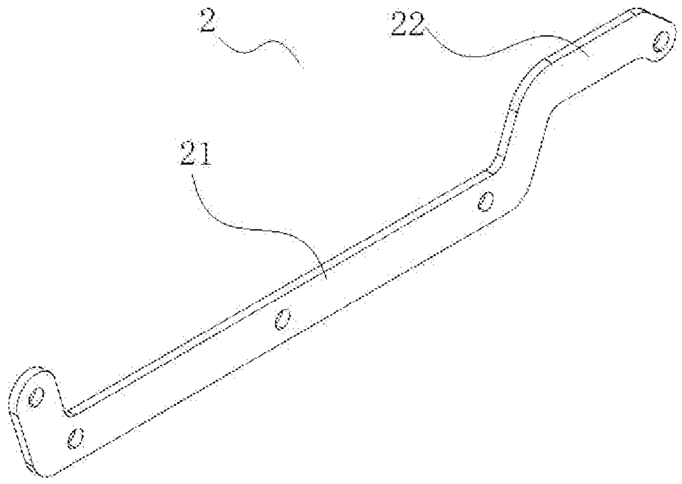
FIG. 7 is a schematic structural view of a fixing piece according to the embodiment one of the present invention.
Figure 8:
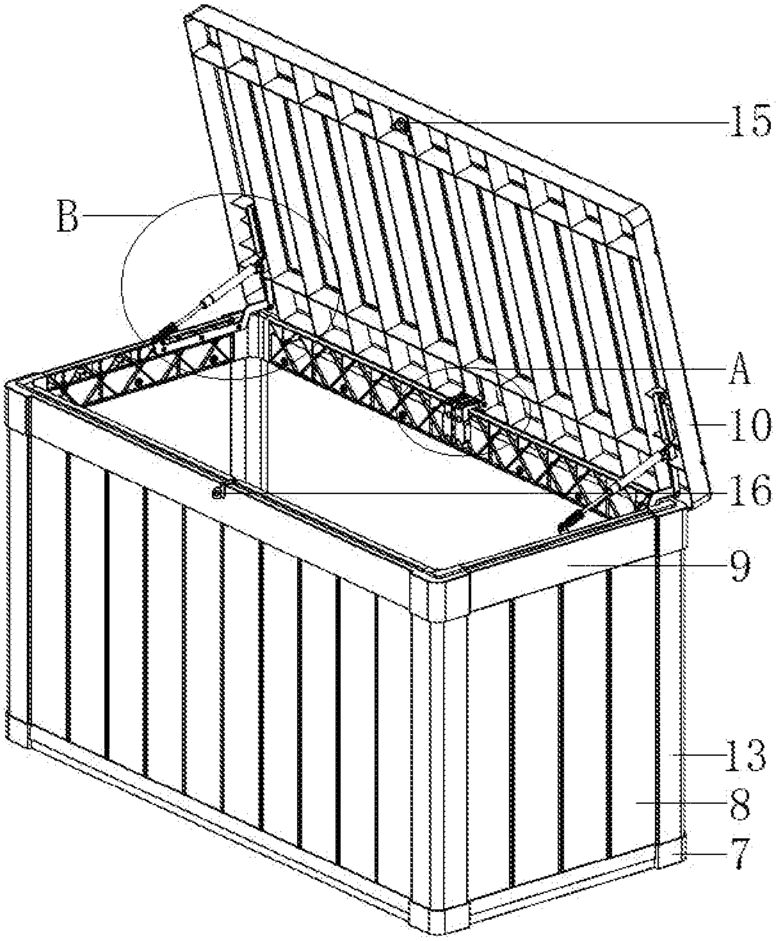
FIG. 8 is a schematic view of an adjustable box according to the embodiment two of the present invention.
Figure 9:
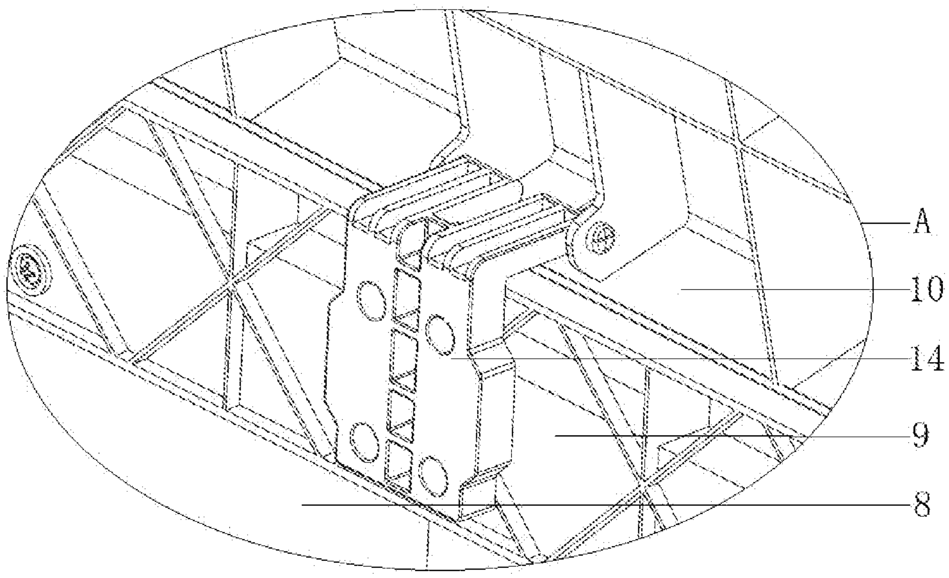
FIG. 9 is an enlarged view of the A part of FIG. 8.
Figure 10:
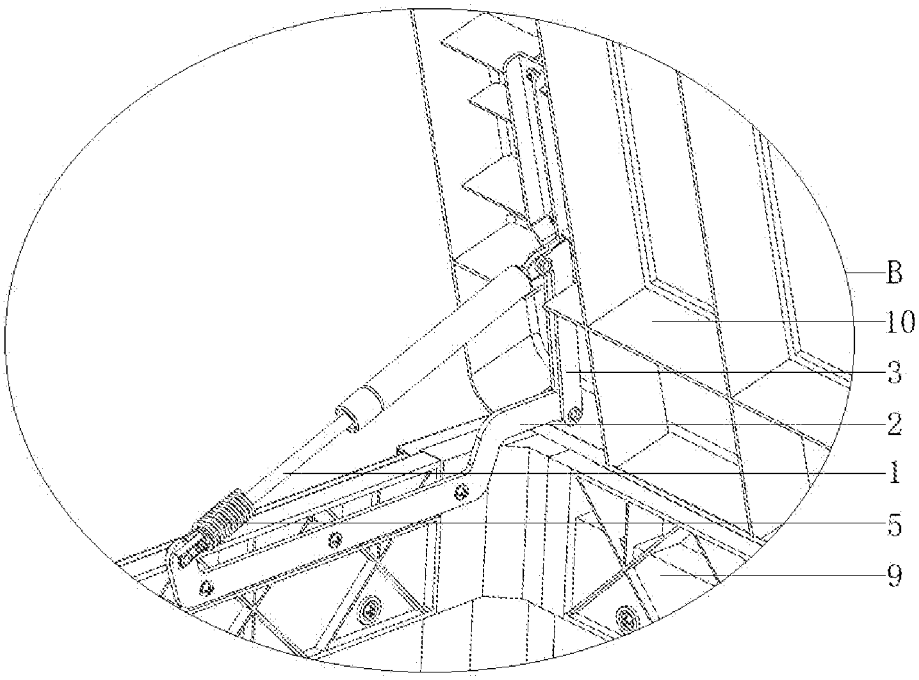
FIG. 10 is an enlarged view of the B part of FIG. 8.
Figure 11:
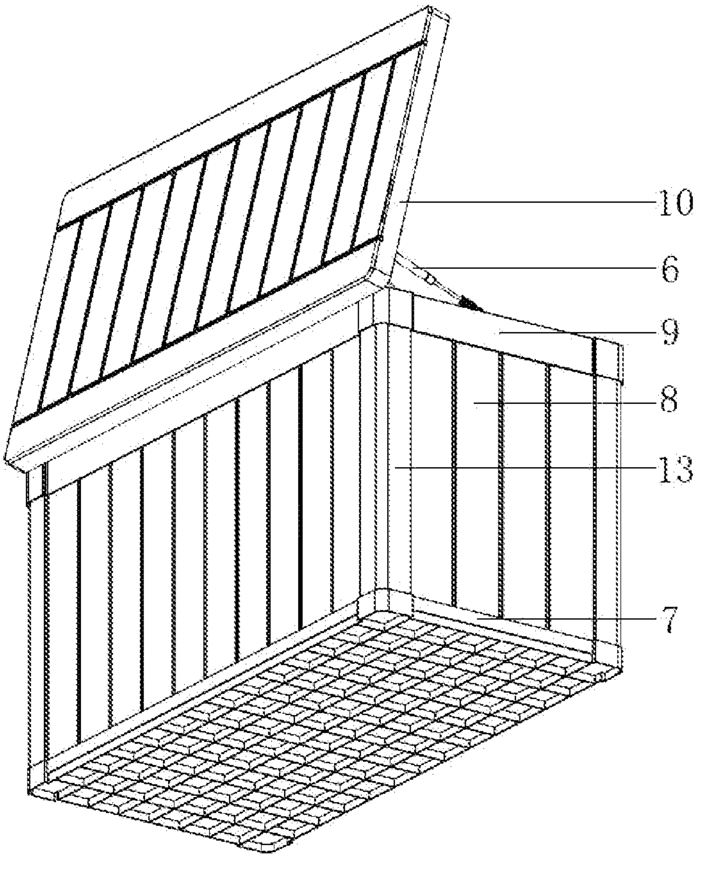
FIG. 11 is a schematic structural view of the adjustable box when the cover body is open according to the embodiment of the present invention.
Figure 12:
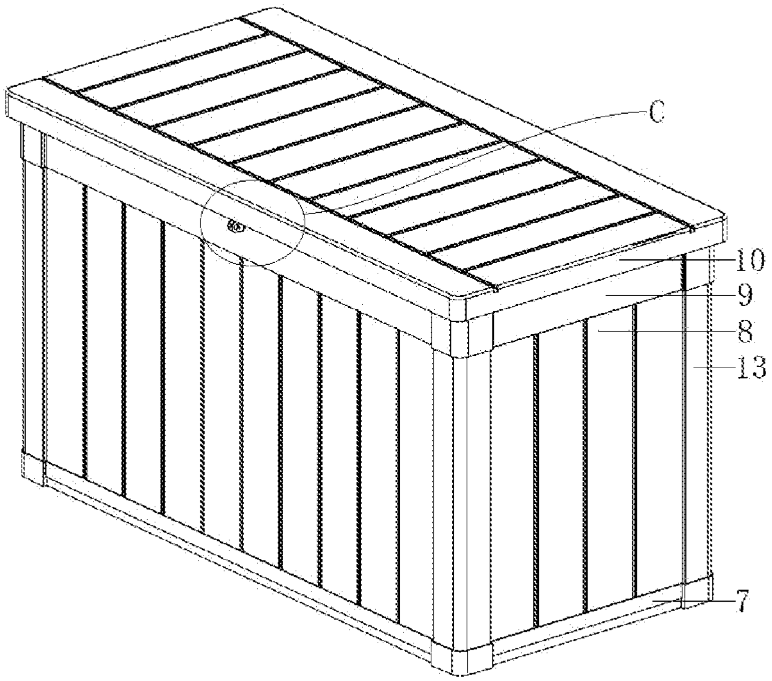
FIG. 12 is a schematic structural view of the adjustable box when the cover body is close according to the embodiment of the present invention.
Figure 13:
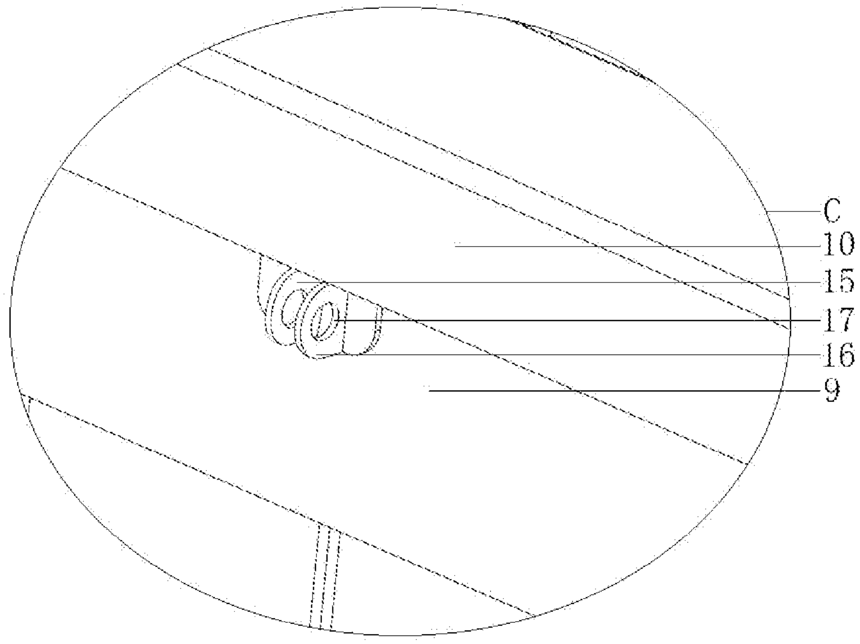
FIG. 13 is an enlarged view of the C part of FIG. 12.
Figure 14:
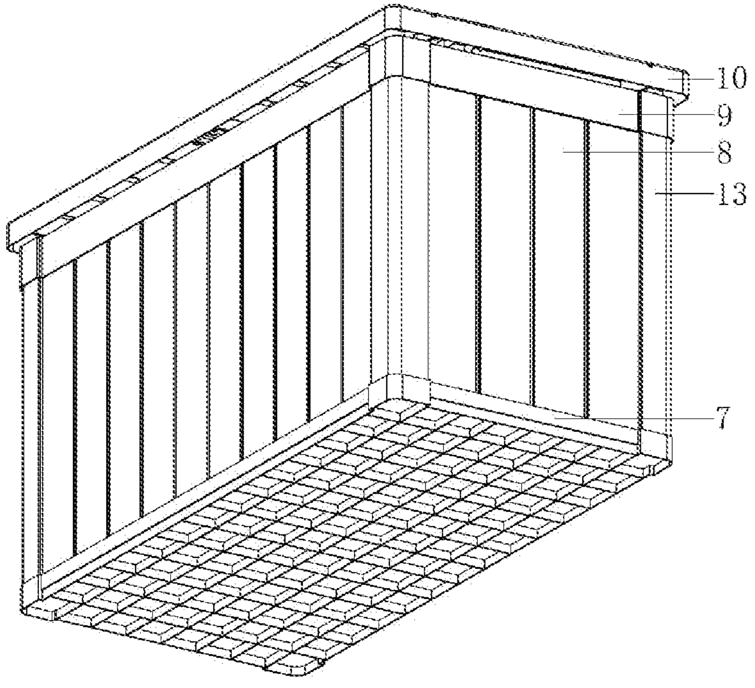
FIG. 14 is another schematic structural view of the adjustable box when the cover body is close according to the embodiment of the present invention.
Figure 15:
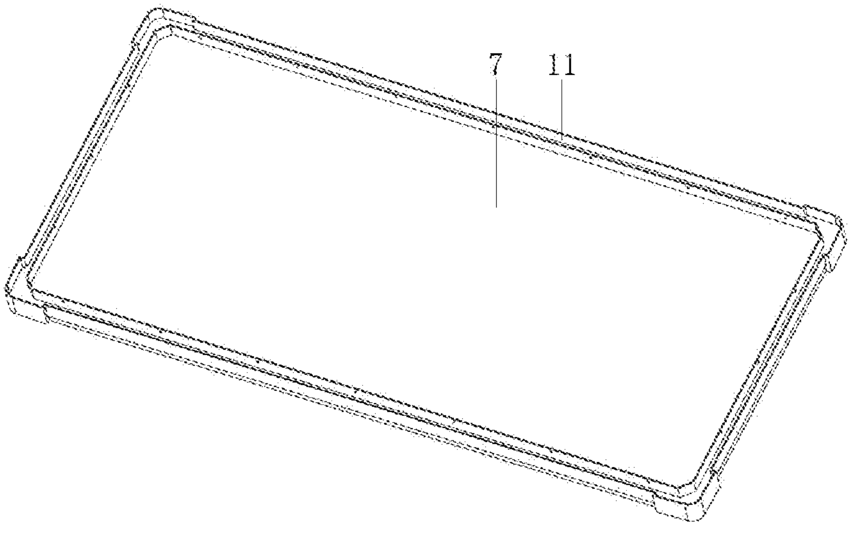
FIG. 15 is a schematic structural view of a bottom plate according to the embodiment of the present invention.
Figure 16:
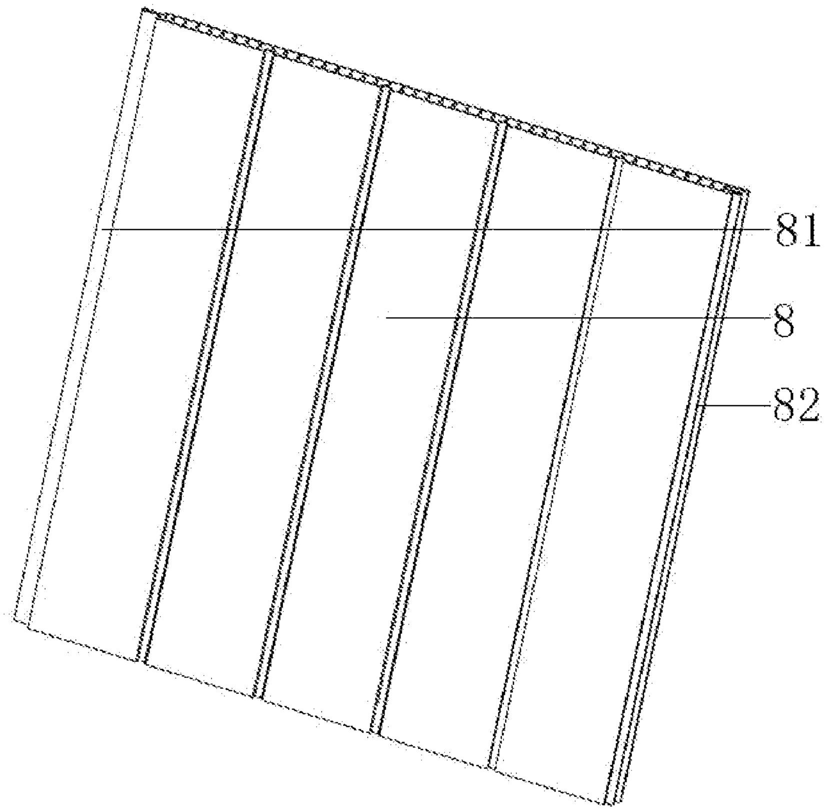
FIG. 16 is a schematic structural view of a side plate according to the embodiment of the present invention.
Figure 17:
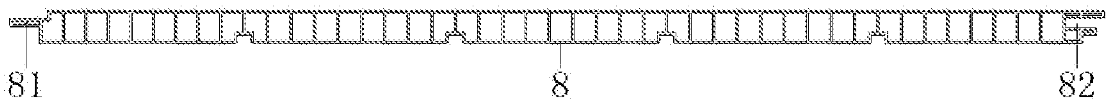
FIG. 17 is another schematic structural view of a side plate according to the embodiment of the present invention.
Figure 18:
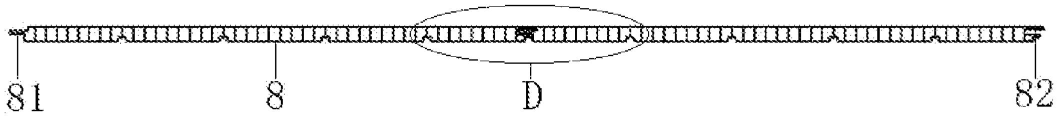
FIG. 18 is a schematic structural view of a combination of a plurality of side plates according to the embodiment of the present invention.
Figure 19:
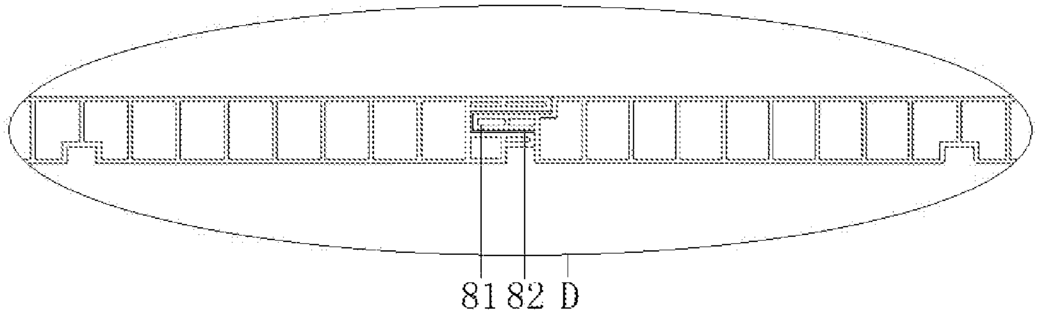
FIG. 19 is an enlarged view of the D part of FIG. 18.
Figure 20:
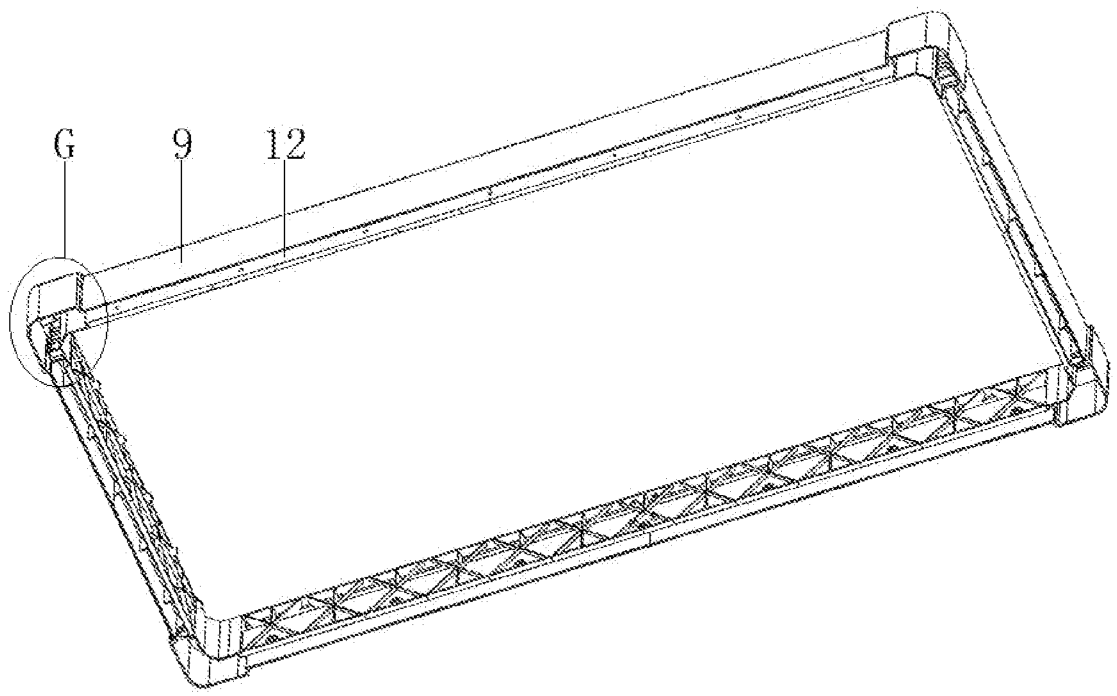
FIG. 20 is a schematic structural view of a frame body according to the embodiment of the present invention.
Figure 21:
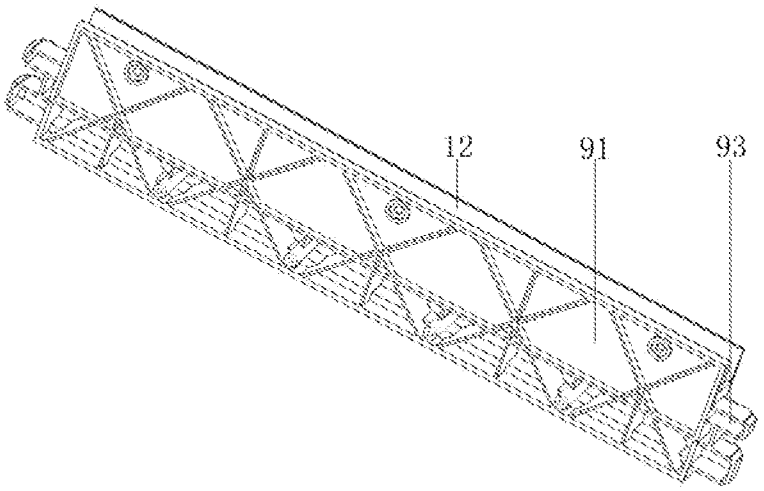
FIG. 21 is a schematic structural view of a first frame portion according to the embodiment of the present invention.
Figure 22:
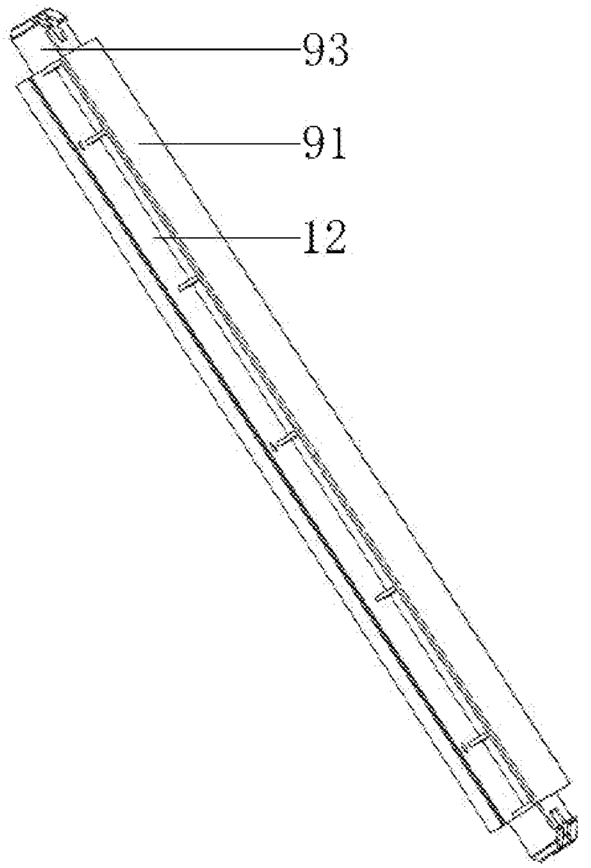
FIG. 22 is another schematic structural view of a first frame portion according to the embodiment of the present invention.
Figure 23:
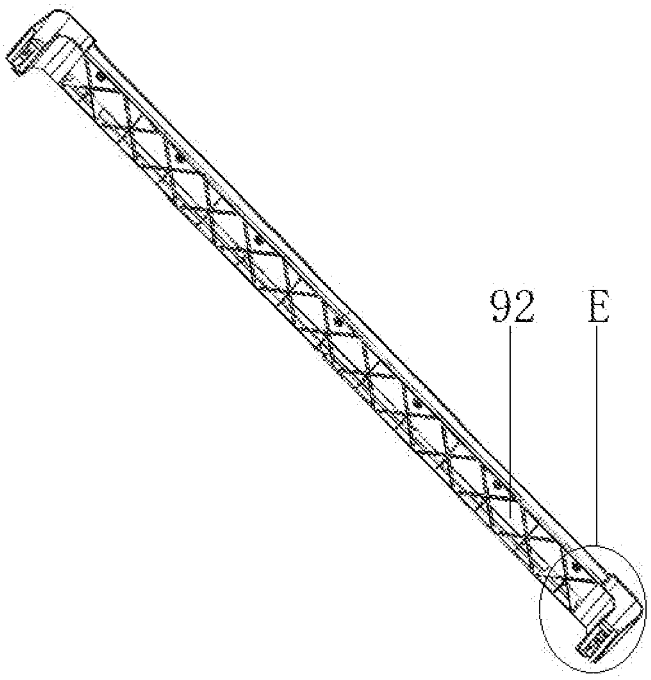
FIG. 23 is a schematic structural view of a second frame portion according to the embodiment of the present invention.
Figure 24:
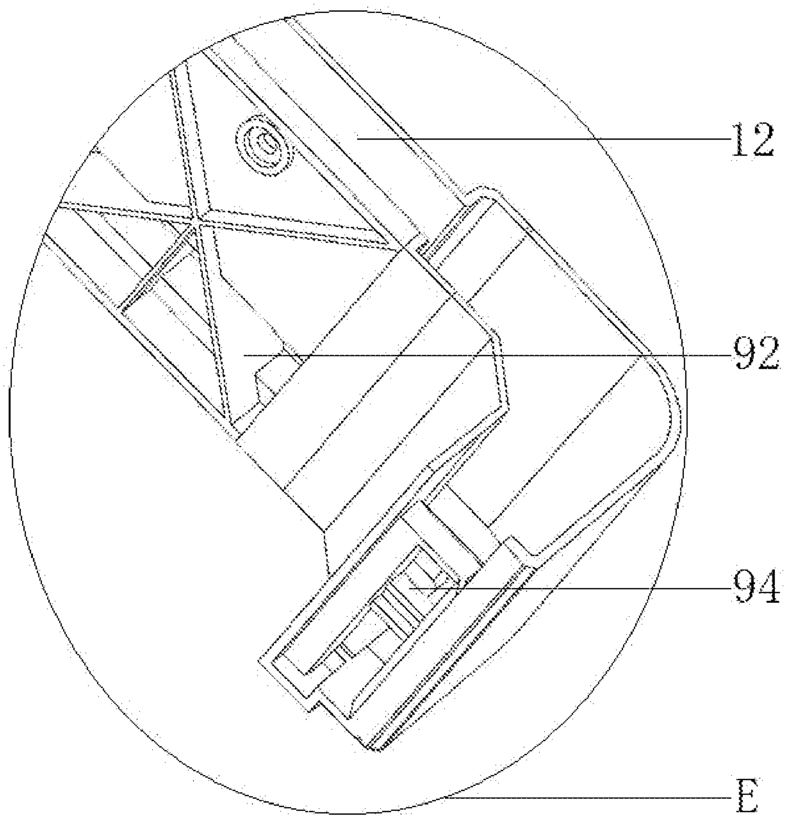
FIG. 24 is an enlarged view of the E part of FIG. 23.
Figure 25:
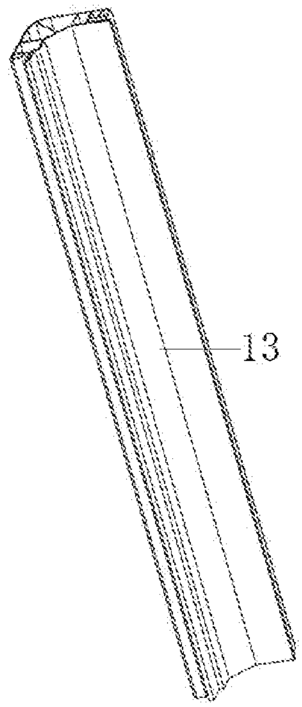
FIG. 25 is a schematic structural view of a first adapter according to the embodiment of the present invention.
Figure 26:
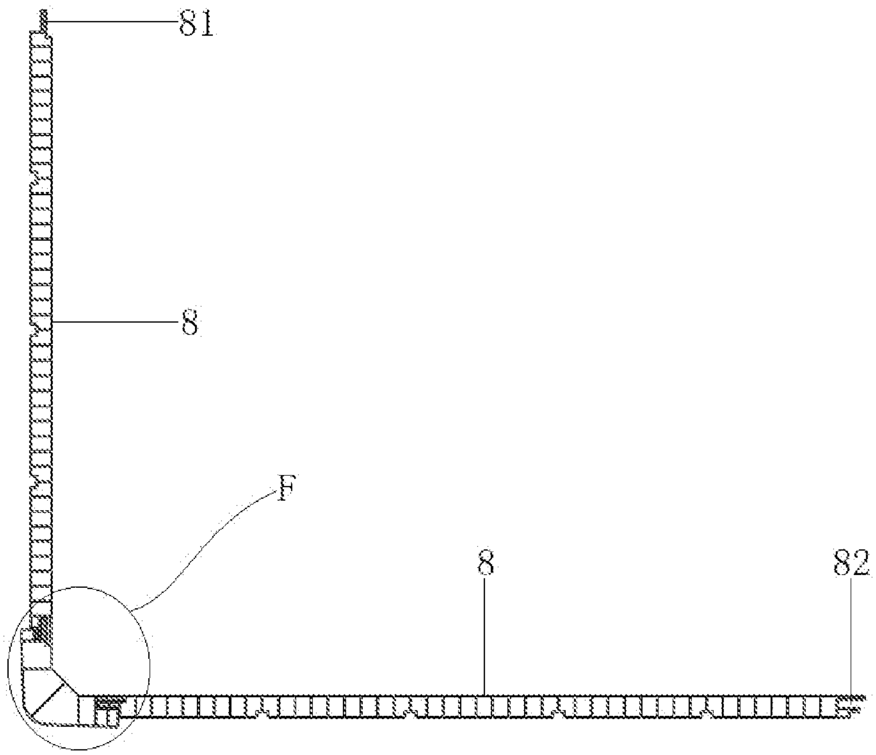
FIG. 26 a schematic structural view of the first adapter connected to the side plates according to the embodiment of the present invention.
Figure 27:
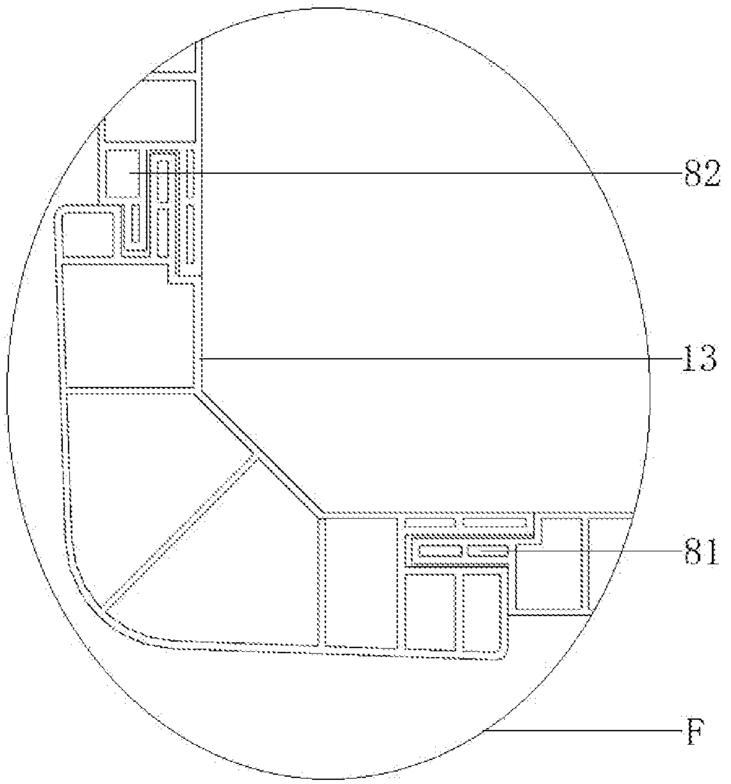
FIG. 27 is an enlarged view of the F part of FIG. 26.
Figure 28:
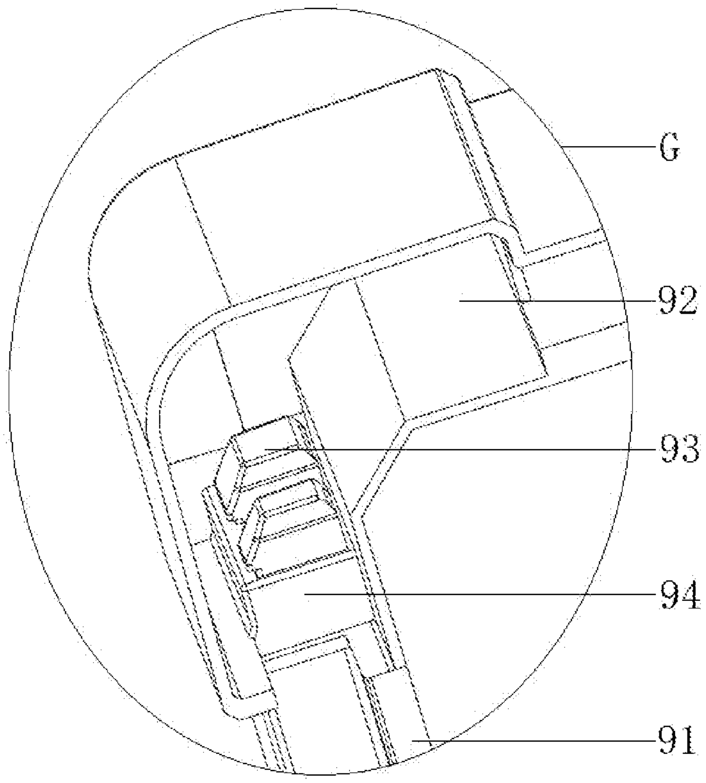
FIG. 28 is an enlarged view of the G part of FIG. 20.

In order to make the telescopic rod structure more reasonable and stable when applied to immovable bodies and cover bodies, as shown in FIG. 2 and FIG. 5, the fixing piece 2 includes an connecting section 21 and a transition section 22 integrally formed with the connecting section 21, and the fixing piece 2 is in a Z-shaped shape as a whole. The connecting section 21 is provided with multiple holes for installation, and the end of the transition section 22 is used to hinge with the movable piece 3. Specifically, the connecting section 21 can be fitted onto the inner wall of an immovable body by passing through the hole position with screws. In this embodiment, the length of the connecting section 21 is greater than the minimum length of the telescopic rod 1, so that when the triangular structure is in the second state, the telescopic rod structure is more compact.

Furthermore, the movable piece 3 includes a first receiving section 31 and a second receiving section 32 that are integrally formed. The first receiving section 31 is provided with a receiving groove 310 for receiving the sleeve 101, and the bottom of the receiving groove 310 is provided with multiple holes for installation. The second receiving section 32 has a hollow portion at a middle part thereof. When the triangular structure 4 is in the second state, the sleeve 101 is received in the receiving groove 310, and the transition section 22 is received in the hollow portion of the second receiving section 32. Specifically, the outer wall of the receiving groove 310 is attached to an immovable body and fixed with screws for installation. The receiving groove 310 and the hollow portion of the second receiving section 32 make the telescopic rod structure more compact, without affecting the complete closure of the cover.

Embodiment Two

Referring to FIGS. 8-28, the embodiment of this present invention also discloses an adjustable box for storing items. The adjustable box includes a bottom plate 7, a plurality of side plates 8 and the aforementioned telescopic rod structure 6. The bottom plate 7 is detachably connected with the side plates 8 which are vertically arranged, to fix the position of the bottom of the side plate 8. Multiple side plates 8 are combined into a circle and cooperate with the bottom plate 7 to form a space for storage. The top of the side plate 8 is detachably connected with a frame body 9, to fix the position of the top of the side plate 8. The frame body 9 is rotatably connected with a cover body 10 for covering and accommodating space. The telescopic rod structure 6 is located between the cover body 10 and the frame body 9. When the cover body 10 is opened, the triangular structure 4 is in the first state, and the telescopic rod structure 6 can support the cover body 10. When the cover body 10 is closed, the triangular structure 4 is in the second state. There are multiple types of bottom plates 7, and different types of bottom plates 7 have different sizes. The Side plates 8, frame body 9, and cover body 10 each have sizes corresponding types of bottom plate 7. By replacing different types of bottom plates 7, the size of the accommodating space can be adjusted.

In the actual use process, according to the usage scenario and actual needs, select a bottom plate 7 with appropriate length and width, connect and fix the side plate 8 with appropriate height on the bottom plate 7, and make all side plates 8 enclose a circle. At this time, the bottom plate 7 and side plate 8 can form a space for accommodating items. Then, install the suitable frame body 9 on the top of the side plate 8 to completely fix the side plate 8, and then install the cover body 10 on the frame body 9, and install the telescopic rod structure 6 between the cover body 10 and the frame body 9 to complete the assembly of the disassembled combination box. At this time, the telescopic rod structure 6 can assist the cover body 10 in opening and closing. Due to the detachable connection between the various components of the disassembly combination box, each component can be disassembled when not in use, reducing the space occupied during storage. At the same time, there are various types of bottom plate 7 with different sizes, and side plate 8, frame body 9, and cover body 10 each have corresponding size types of bottom plate 7, therefore, different sizes of components can be flexibly selected for assembly according to the application scenario and actual needs during use, and the size of the disassembled and assembled box can be adjusted accordingly. Concluded from the above, the disassembled combination box is easy to store and can be adjusted in size.

The above scheme has already explained that there are multiple types of bottom plates 7, and different types of bottom plates 7 have different sizes. However, in addition to the size, the type of bottom plate 7 can also be changed by changing the shape. Therefore, in this embodiment, the following design has been carried out. Specifically, different types of bottom plates 7 have different shapes, and side plates 8, frame body 9, and cover body 10 each have corresponding shape types of bottom plate 7. By replacing different types of bottom plates 7, the size of the accommodating space can be changed. The above scheme does not limit the shape of the bottom plate 7, which can be a triangle, rectangle, or polygon. In this embodiment, the most common rectangle in the box is used as an example.

In order to more conveniently connect and fix the side plate 8, the following design has been carried out in this embodiment. Specifically, the top of the bottom plate 7 is provided with a lower slot 11, and the bottom of the frame body 9 is provided with an upper slot 12. The bottom of the side plate 8 is inserted into the lower slot 11, and the top is inserted into the upper slot 12. Additionally, the side plate 8 can be detachably connected to the bottom plate 7, and the side plate 8 can be detachably connected to the frame body 9 through threaded connections. Through the design of the above structure, the bottom of side plate 8 can be inserted into the lower slot 11 for approximate limit, and then the top of side plate 8 can be inserted into the upper slot 12 for approximate limit. After that, it is fixed with bolts, which is simple and convenient to operate, saves time required for positioning, and is more firmly connected.

Due to the various types and sizes of the bottom plate 7, if the side plate 8 is also set with a type corresponding to the size of the bottom plate 7, the processing cost is too high and it is difficult to find during assembly. Therefore, in this embodiment, the design is as follows: the side plate 8 has a first end and a second end that are far away from each other in the horizontal direction, the first end of the side plate 8 is provided with a first plug plate 81, the second end is provided with a first slot 82, and the first plug plate 81, the first slot 82 and the side plate 8 are located on the same plane, and different side plates 8 can be connected together through the first plug plate 81 and the first slot 82. Through the design of the above structure, the size types required for side plate 8 can be greatly reduced, only need to simply plug and combine different side plates 8 together to match the length and width of the bottom plate 7.

It should be noted that the material of side plate 8 is not limited in the above scheme. Therefore, when side plate 8 is made of flexible materials, such as plastic, the size of side plate 8 can also be adjusted by cutting.

Due to the hollow nature of frame body 9, it occupies a large storage area and is inconvenient to install when combined with side plate 8. To solve these problems, the structure of frame body 9 has been designed as follows in this embodiment. Specifically, the bottom plate 7 is arranged in a rectangular shape, and frame body 9 includes two first frame portions 91 and two second frame portions 92. The bottom of the first frame portion 91 can be detachably connected to the side plate 8, and the bottom of the second frame portion 92 can be detachable connected to the side plate 8. The first frame portion 91 and the second frame portion 92 are vertically arranged and detachably connected to each other, thereby enclosing the frame body 9. Through the design of the above structure, the frame body 9 can be disassembled into strips, which greatly reduces the storage area. At the same time, when combined and installed, it can be connected to the side plate 8 on one side first, making it more convenient.

In order to achieve a detachable connection between the first frame portion 91 and the second frame portion 92, the following design has been carried out in this embodiment. Specifically, the first frame portion 91 is provided with buckle heads 93 at both ends, and the second frame portion 92 is provided with buckle seats 94 at both ends. The buckle heads 93 can be inserted into the buckle seats 94 to make the first frame portion 91 and the second frame portion 92 buckle connected. By using the above method, the overall firmness of frame body 9 can be ensured, while being easy to disassemble.

Although the bottom and top of side plate 8 are both restrained and fixed, deformation and other situations may occur on the sides. At the same time, there are usually gaps between adjacent side plates at the corners, which affect the overall sealing of the disassembled combination box. To solve the above problems, the following design was carried out in this embodiment, specifically including multiple first adapters 13, the first adapter 13 is vertically arranged and each first adapter 13 is detachably connected to two adjacent side plates 8 with an angle. The top of the first adapter 13 is connected to the frame body 9, and the bottom is connected to the bottom plate 7. Through the design of the above structure, the overall sealing and corner stability of the disassembled combination box have been enhanced, making the side plate 8 less prone to deformation.

There are various ways in which the first adapter 13 and side plate 8 can be detachably connected. In this embodiment, one of the connection methods is introduced: a first slot 82 corresponding to the first plug 81 and a second plug corresponding to the first slot 82 can be set on the first adapter 13, so that the first adapter 13 and side plate 8 can be connected by inserting in the slots.

There are various ways to rotate and connect the cover body 10 and the frame body 9, but most of the structures are not easy to disassemble and cannot be used in conjunction with the disassembly combination box mentioned above. In order to make the cover body 10 and the frame body 9 more convenient for disassembly and assembly, the following design has been carried out in this embodiment. Specifically, a second adapter 14 is also detachably connected to the frame body 9 and rotatably connected to the cover body 10, enable quick disassembly and assembly of the cover body 10 with the frame body 9 through the second adapter 14.

In order to enhance the safety of the disassembled combination box and prevent the cover body 10 from being bumped open during transportation, the following design has been carried out in this embodiment: a first fixing member 15 is also provided, which can be detachably connected to the cover body 10. One end of the first fixing member 15 extends out of the cover body 10, and a second fixing member 16 corresponding to the first fixing member 15 can be detachably connected to the frame body 9. The first fixing member 15 and the second fixing member 16 are provided with corresponding through holes 17 at one end that extends out of the cover body 10, which can be used in conjunction with locks to limit the cover body 10 when the cover is closed to accommodate space. In addition, the connection parts between the various components in this embodiment are located within the accommodation space, which can prevent other personnel from disassembling the disassembly combination box from outside.

In addition, the bottom plate 7, frame body 9, and cover body 10 in this embodiment are all provided with grid grids, which can enhance the stability of the above components, prevent deformation, and have stronger load-bearing capacity. The side plate 8 and the first adapter 13 in this embodiment are both hollowed out internally, which can significantly reduce weight and save manufacturing costs.

It should be noted that the terms used here are only for describing specific embodiments, and are not intended to limit the exemplary embodiments according to this application. As used here, unless the context explicitly indicates otherwise, the singular form is also intended to include the plural form. In addition, it should be understood that when the terms "including" and/or "including" are used in this specification, they indicate the presence of features, steps, operations, devices, components, and/or combinations of them.

In addition, it should be noted that the use of words such as "first" and "second" to define components is only for the purpose of distinguishing the corresponding components. If not otherwise stated, the above words have no special meaning and cannot be understood as limiting the scope of protection in this application.

Although embodiments of the present invention have been shown and described, it can be understood by ordinary technical personnel in the art that multiple changes, modifications, substitutions, and variations can be made to these embodiments without departing from the principles and spirit of the present invention. The scope of the present invention is limited by the accompanying claims and their equivalents.

What is claimed is:

1. A telescopic rod structure, comprising:

a telescopic rod comprising a sleeve, and a piston rod slidably connected to the sleeve in a manner that the telescopic rod is extended or shortened by sliding the piston rod in the sleeve;

a fixing piece, the fixing piece comprising a first end and an opposite second end, the fixing piece being fixedly arranged on an immovable body, and the first end of the fixing piece being hinged with an end of the piston rod;

a movable piece, the movable piece being fixedly arranged on a movable body, an end of the movable piece being hinged with the second end of the fixing piece, and the movable piece being hinged with an end of the sleeve, thereby the telescopic rod, the movable piece and the fixing piece enclosing a transformable triangular structure having a first state unfolded in a triangular shape and a second state folded in a strip shape, when the telescopic rod is driven to extend, the triangular structure is switched to the first state, when the telescopic rod is driven to shorten, the triangular structure is switched to the second state; and an elastic member, sleeved on the piston rod, and when the triangular structure is in the second state, the elastic member is in a compressed state under an acting force of the sleeve.

2. The telescopic rod structure according to claim 1, wherein the telescopic rod is a hydraulic rod or a pneumatic rod.

3. A telescopic rod structure, comprising:

a telescopic rod comprising a sleeve, and a piston rod slidably connected to the sleeve in a manner that the telescopic rod is extended or shortened by sliding the piston rod in the sleeve;

a fixing piece, the fixing piece comprising a first end and an opposite second end, the fixing piece being fixedly arranged on an immovable body, and the first end of the fixing piece being hinged with an end of the piston rod; and a movable piece, the movable piece being fixedly arranged on a movable body, an end of the movable piece being hinged with the second end of the fixing piece, and the movable piece being hinged with an end of the sleeve, thereby the telescopic rod, the movable piece and the fixing piece enclosing a transformable triangular structure having a first state unfolded in a triangular shape and a second state folded in a strip shape, when the telescopic rod is driven to extend, the triangular structure is switched to the first state, when the telescopic rod is driven to shorten, the triangular structure is switched to the second state;

wherein the fixing piece comprises a connecting section and a transition section integrally formed with the connecting section, the whole fixing piece is Z-shaped, the connecting section is provided with a plurality of mounting holes, and an end of the transition section serving as the second end of the fixing piece is hinged with the movable piece.

4. The telescopic rod structure according to claim 3, wherein the movable piece comprises a first receiving section and a second receiving section integrally formed with the first receiving section, the first receiving section is provided with a receiving groove configured for receiving the sleeve, a bottom of the receiving groove is provided with a plurality of mounting holes, a middle part of the second receiving section is hollow, when the triangular structure is in the second state, the sleeve is received in the receiving groove, and the transition section is received at the hollow middle part of the second receiving section.

5. An adjustable box, comprising:

the telescopic rod structure of claim 3;

a bottom plate and a plurality of side plates, the bottom plate being detachably connected with a plurality of side plates, the plurality of side plates and the bottom plate cooperatively enclosing an accommodating space, the side plates being detachably connected with a frame body, and the frame body being rotatably connected with a cover body for covering the accommodating space, the telescopic rod structure being arranged between the cover body and the frame body, when the cover body is open, the triangular structure is in the first state, and the telescopic rod structure supports the cover body; and when the cover body closes the accommodating space, the triangular structure is in the second state.

6. The adjustable box according to claim 5, wherein each side plate has a first end and an opposite second end in a horizontal direction, the first end of the side plate is provided with a first plug plate, and the second end is provided with a first slot, and the first plug plate, the first slot, and the side plate are located on a same plane, and the side plates are connected and combined together through the first plug plate plugging in the adjacent first slot.

7. The adjustable box according to claim 5, wherein a top of the bottom plate is provided with a lower slot, and a bottom of the frame body is provided with an upper slot, a bottom of each side plate is inserted into the lower slot, and a top of each side plate is inserted into the upper slot, the side-plates are detachably connected to the bottom plate, and the side plates are detachably connected to the frame body through threaded connections.

8. The adjustable box according to claim 5, wherein the bottom plate is in a rectangular shape, and the frame body comprises:

two first frame portions, a bottom of each of the first frame portions being detachably connected to the side plates; and two second frame portions, a bottom of each of the second frame portions being detachably connected to the side plates;

and the first frame portions are detachably connected to the second frame portions in a perpendicular manner, thereby enclosing the frame body.

9. The adjustable box according to claim 8, wherein the first frame portions are provided with buckle heads at both ends, and the second frame portions are provided with buckle seats at both ends, the buckle heads is inserted into the buckle seats to make the first frame portions and the second frame portions buckle connected.

10. The adjustable box according to claim 5, further comprising a plurality of first adapters, wherein the first adapters are vertically arranged, and each of the first adapters is detachably connected to two adjacent side plates, a top of each first adapter is connected to the frame body, and a bottom of each first adapter is connected to the bottom plate.

11. The adjustable box according to claim 10, further comprising a plurality of second adapters, the second adapters being detachably connected to the frame body and rotatably connected to the cover body, enabling the cover body to open or close the accommodate space through rotation.

12. The adjustable box according to claim 11, further comprising a first fixing member and a second fixing member, wherein the first fixing member is detachably connected to the cover body, the frame body is detachably connected to the second fixing member, the first fixing member and the second fixing member each have an end extending out of the cover body, and the ends are provided with through holes configured for cooperating with a lock to limit the cover body when the cover body covers the accommodate space.

13. The telescopic rod structure according to claim 3, further comprising an elastic member, sleeved on the piston rod, and when the triangular structure is in the second state, the elastic member is in a compressed state under an acting force of the sleeve.

* * * * *